C. H. WOOD.
Button.

No. 226,815.  Patented April 20, 1880.

Witnesses:
R. F. Barnes.
Warren Seely.

Inventor:
Charles H. Wood
by Ellis Spear
Attorney.

UNITED STATES PATENT OFFICE.

CHARLES H. WOOD, OF WRENTHAM, MASSACHUSETTS.

BUTTON.

SPECIFICATION forming part of Letters Patent No. 226,815, dated April 20, 1880.

Application filed February 7, 1880.

To all whom it may concern:

Be it known that I, CHARLES H. WOOD, of Wrentham, in the county of Norfolk and State of Massachusetts, have invented a new and useful Improvement in Buttons; and I do hereby declare that the following is a full, clear, and exact description of the same.

My invention relates to separable buttons, and is applicable to such buttons whether made of the larger size for ordinary sleeve-buttons or smaller, and designed for use upon the collar or shirt-fronts.

The object of the invention is to secure simplicity and cheapness of construction.

Figure 1:
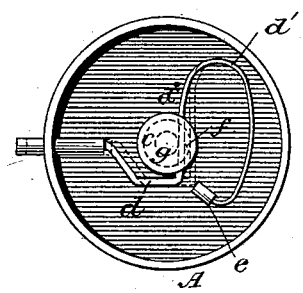
Figure 2:
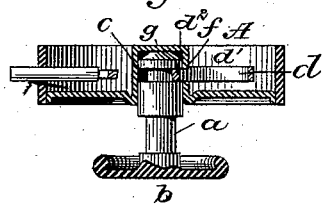

The accompanying drawings represent, in Figure 1, a top view with the setting removed, and in Fig. 2 a central vertical section.

The shank or post of the button $a$ is fixed to the inner disk, $b$, and is provided at the end opposite the disk with an annular groove, $c$. The extreme end of the post is rounded, in order that it may push back the catch on entering and permit it to enter the annular groove.

The catch is composed of a single piece of elastic wire. (Shown in Fig. 1 at $d$.) This wire, preferably flattened at one end, is formed into a bow, $d'$, and is fixed by means of a hollow stud, $e$, placed in close proximity to the shank and secured to the bottom plate of the outer disk, A, in order to serve as a stop for the spring, as described hereinafter. This bow $d'$ constitutes the spring.

A straight part, $d^2$, when the spring is in place, lies opposite the notch $f$ in the hollow boss $g$. This hollow boss receives the grooved post, and when said post is in place the groove therein comes opposite the notch in the hollow boss. The notch in said boss is deep enough to allow the part $d^2$ to engage with the grooved post, thereby holding the two parts securely together. The wire which forms the catch is bent around the boss, as shown in Fig. 1, and a straight and slightly-enlarged part of it is passed out through a hole in the rim, the end projecting sufficiently, so that by pressing upon it the straight part $d^2$ may be thrown out of connection with the stud. The spring is adjusted so as to keep it constantly engaged, except when thus under pressure.

The spring and catch can be made of wire, or of any other convenient material, and the other parts may be easily made in a manner well known to those skilled in the art.

The stud to which the spring is attached is placed as shown in Fig. 1, so as to limit the motion of the straight part $d^2$ and prevent it from moving entirely out of the notch or kerf in the hollow boss. By these means the catch is held securely against displacement.

Any kind of setting may be used to cover the outer disk, A.

If desired, the pusher, instead of passing through the rim of the button, may pass up through the upper plate and work in a slot in such plate, any ornamental form being given it that may be desired.

What I claim is—

1. The combination, with the outer disk of a separable button having the hollow notched post and the inner disk having the grooved shank, of the spring-catch adapted to engage with such post and shank, and having its end forming a stop for preventing its disengagement from the notch in such hollow post, substantially as set forth.

2. A spring-catch for connecting the parts of a separable button, having its inner end secured to a stud, $e$, upon the outer disk of such button in close proximity to the notch in the hollow post, such stud forming a stop for limiting the motion of the catch and preventing its disengagement from such notched post, as set forth.

In testimony whereof I have signed my name to this specification in the presence of two subscribing witnesses.

CHARLES H. WOOD.

Witnesses:
W. H. CHEEVER,
J. E. POND, Jr.